Feb. 26, 1957 E. WILDHABER ET AL 2,782,690
MACHINE FOR CUTTING CLUTCH TEETH AND THE LIKE
Filed Sept. 23, 1955 10 Sheets-Sheet 1

IVENTORS
ERNEST WILDHABER
NORMAN W. FOWLER

BY Richard W. Treverton
ATTORNEY

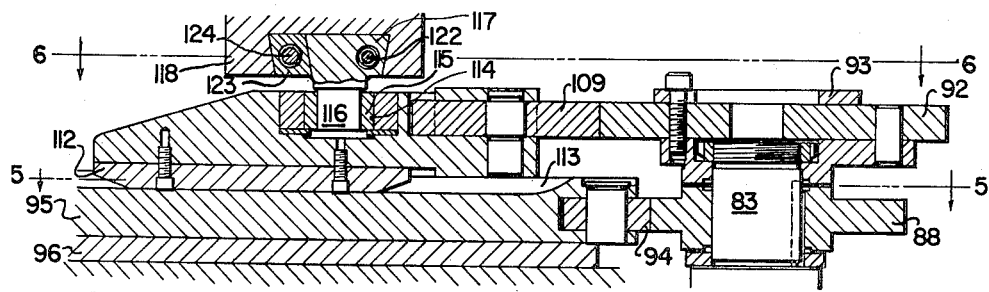
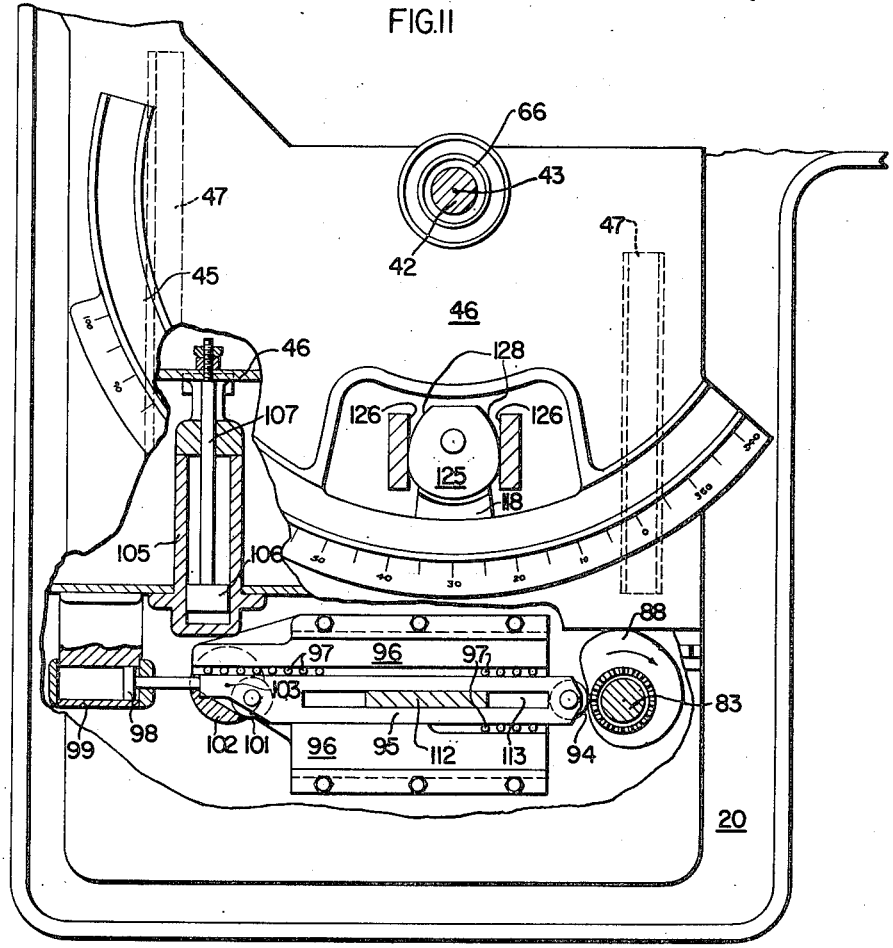
FIG. 5

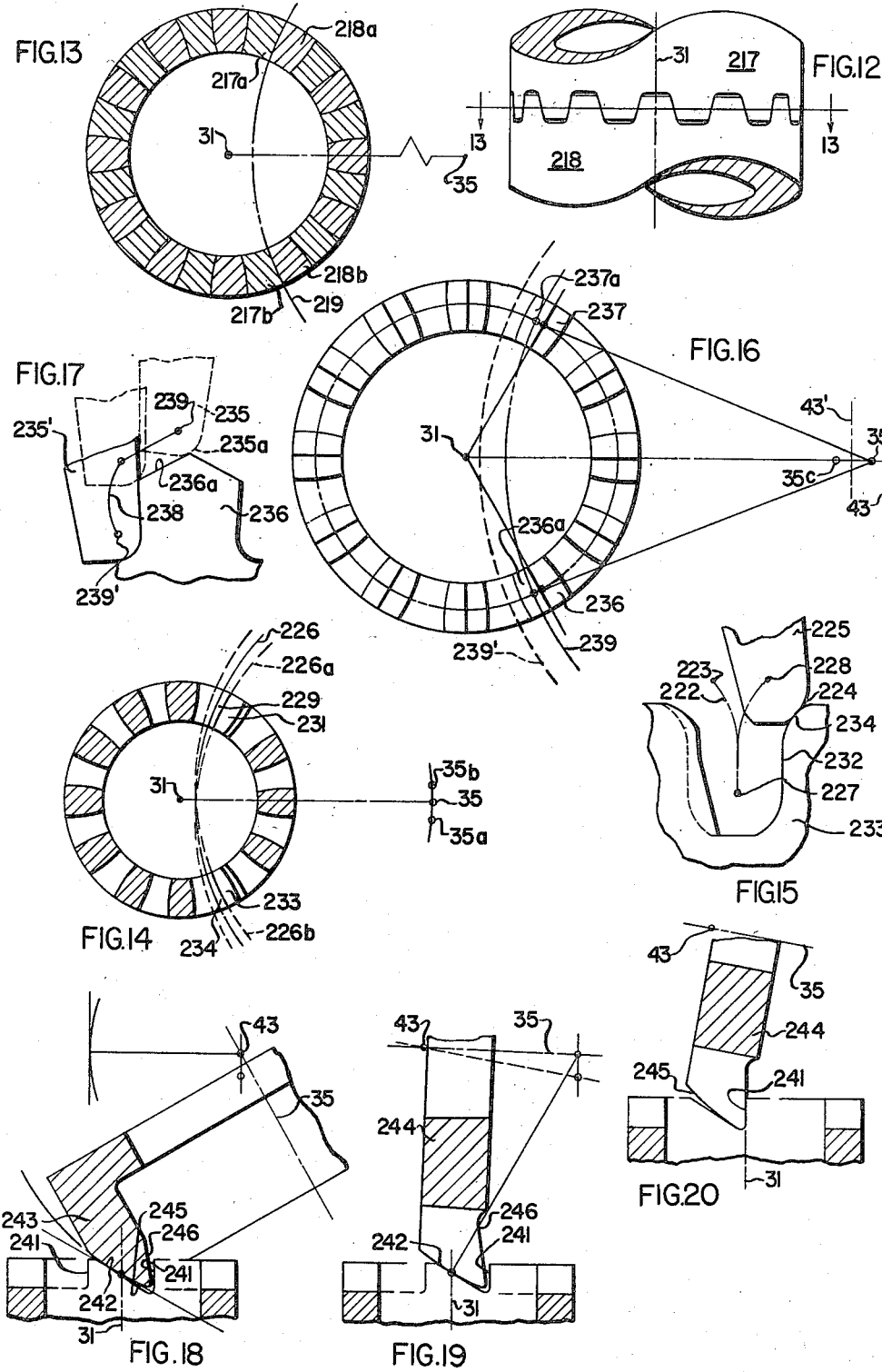

Feb. 26, 1957     E. WILDHABER ET AL     2,782,690
MACHINE FOR CUTTING CLUTCH TEETH AND THE LIKE
Filed Sept. 23, 1955            10 Sheets-Sheet 10

United States Patent Office 2,782,690
Patented Feb. 26, 1957

2,782,690

MACHINE FOR CUTTING CLUTCH TEETH AND THE LIKE

Ernest Wildhaber and Norman W. Fowler, Brighton, N. Y., assignors to The Gleason Works, Rochester, N. Y., a corporation of New York Application September 23, 1955, Serial No. 536,242

14 Claims. (Cl. 90—9.4)

The present invention relates to a tooth cutting machine or the like, and more particularly to an improved machine of the general type disclosed in Patents 2,464,913 and 2,608,906, granted respectively on March 22, 1949, and September 2, 1952, to E. Wildhaber.

The nature of these improvements and the advantages thereof will appear from the following description of the preferred embodiment shown in the accompanying drawings, wherein.

Figure 2:
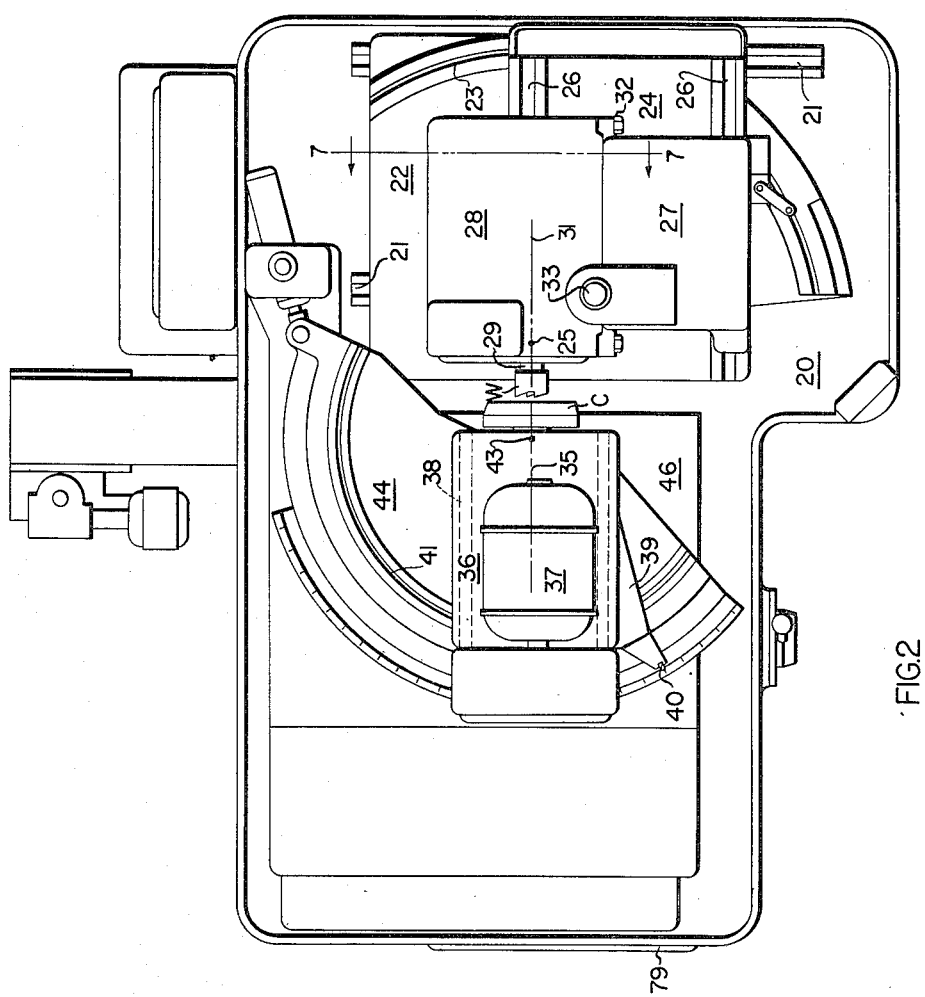
Figure 3:
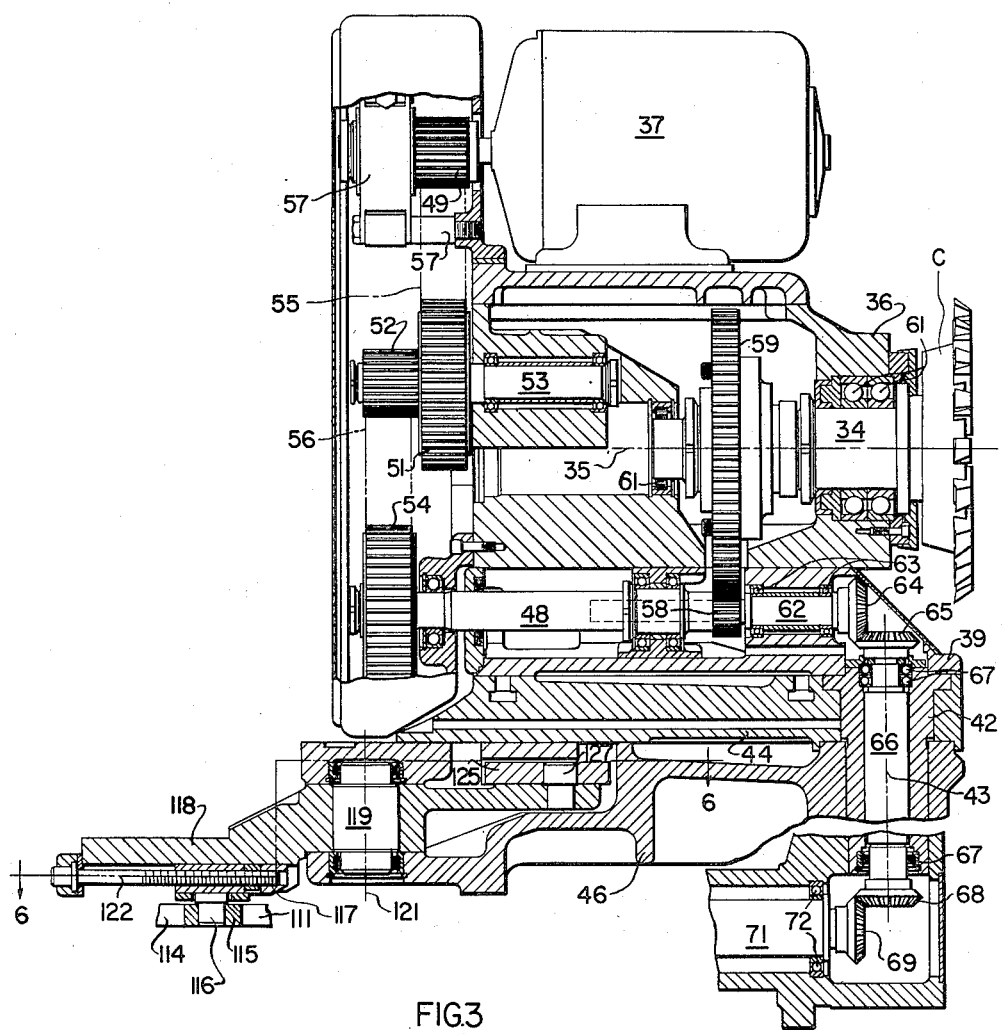
Fig. 3 is a vertical sectional view through the cutter head and related parts.
Figure 6:
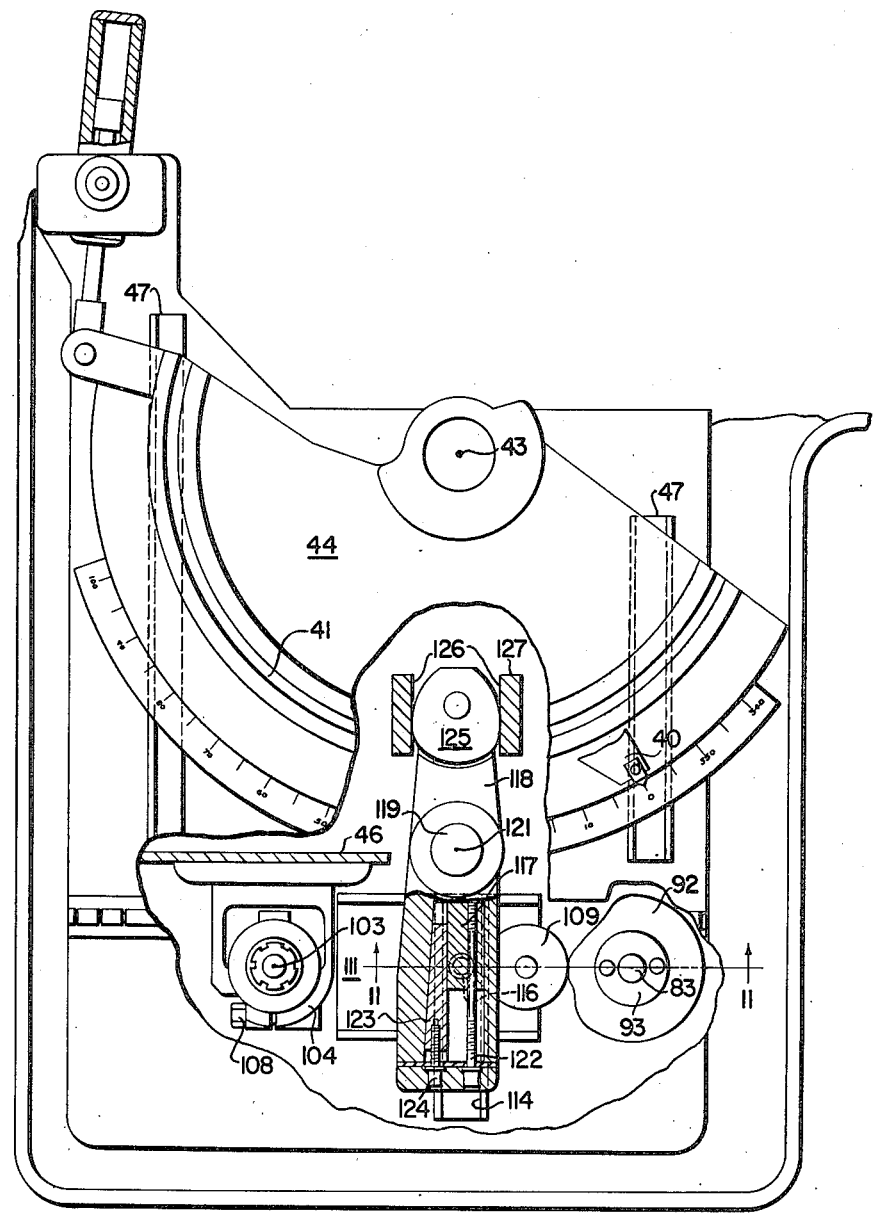
Figure 7:
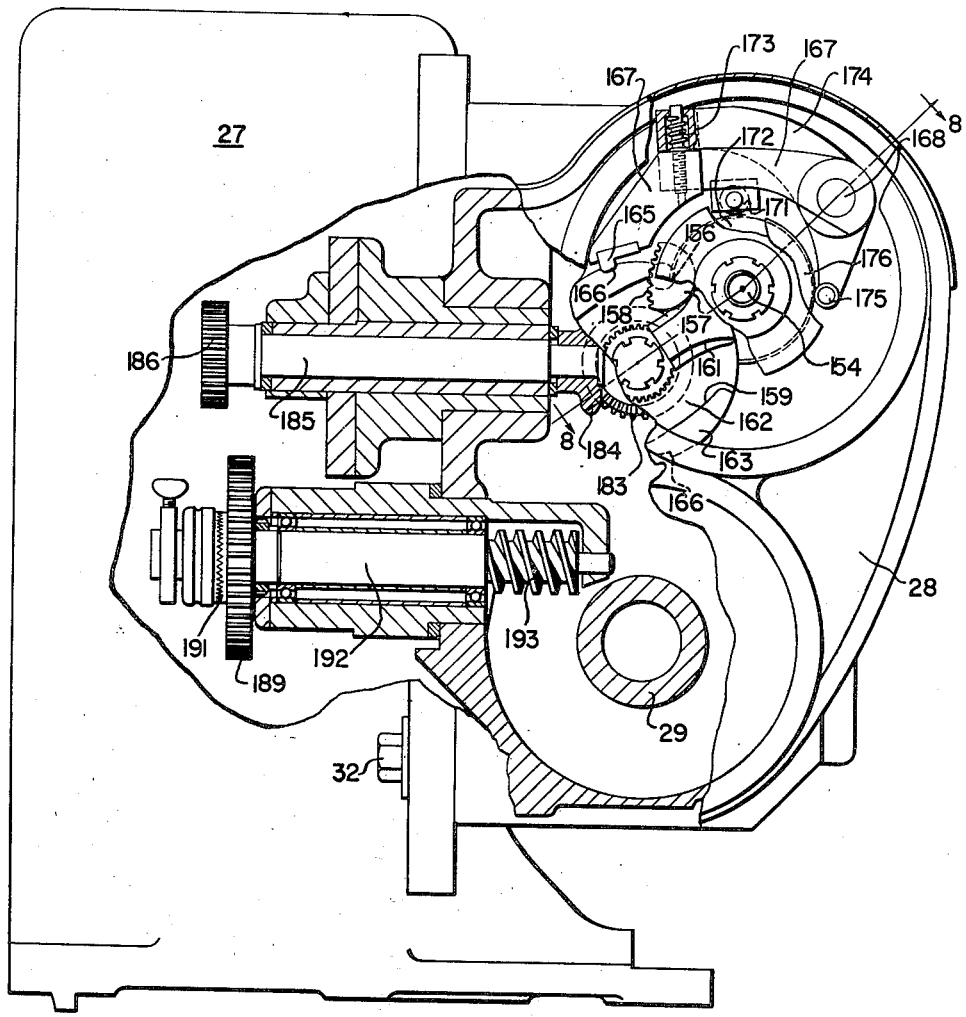
Figure 8:
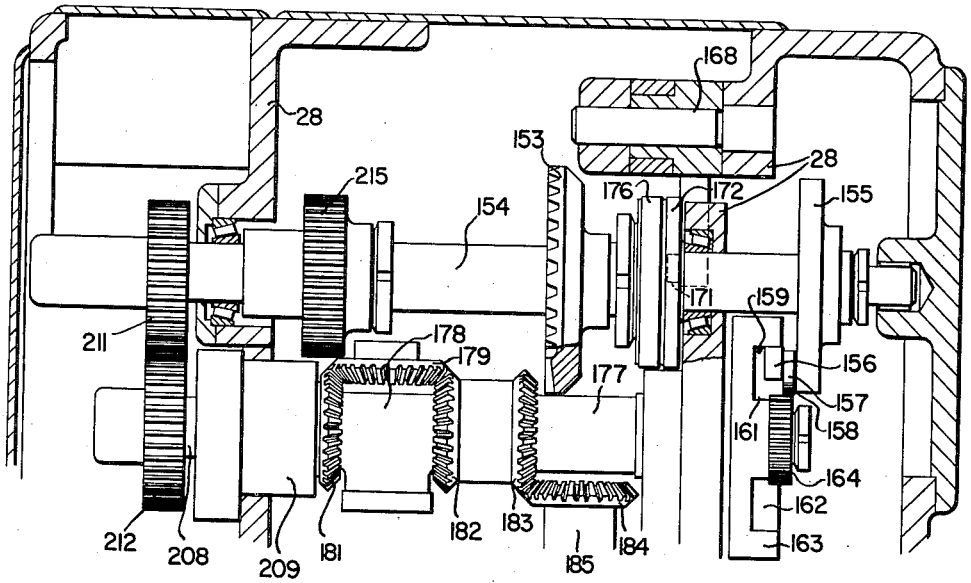
Figure 9:
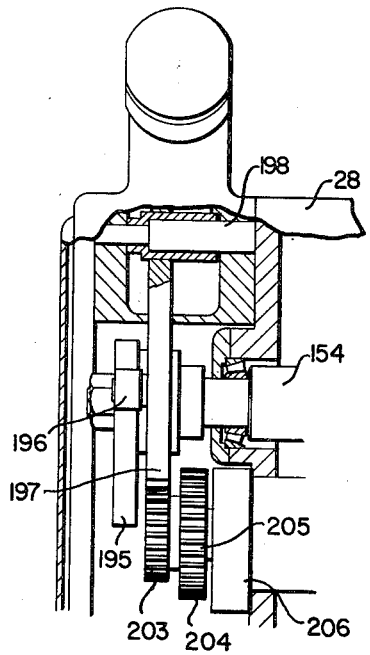
Figure 10:
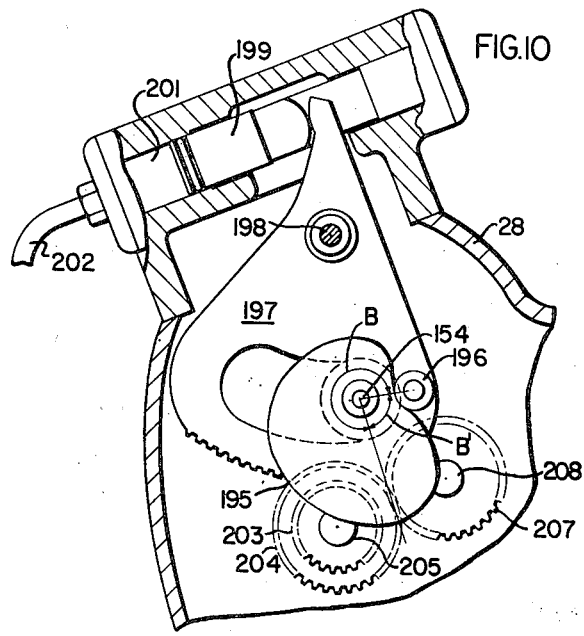
Figure 23:
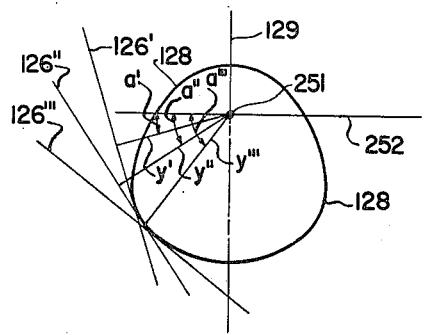
Figure 21:
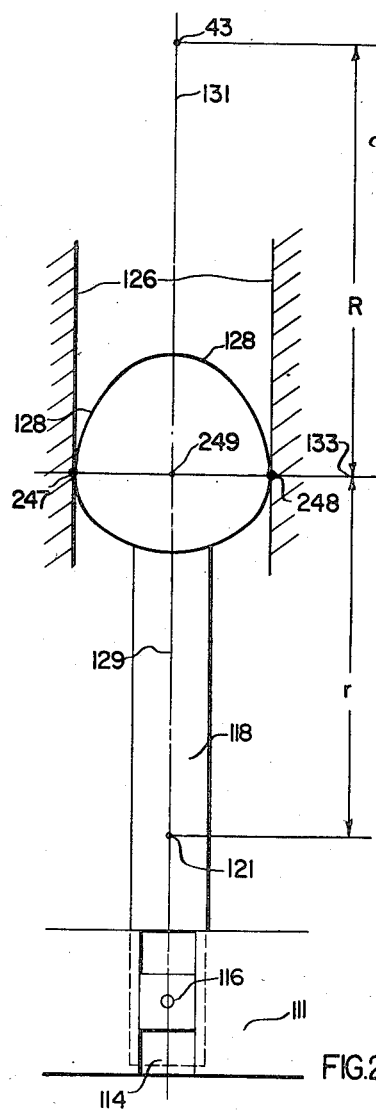
Figure 22:
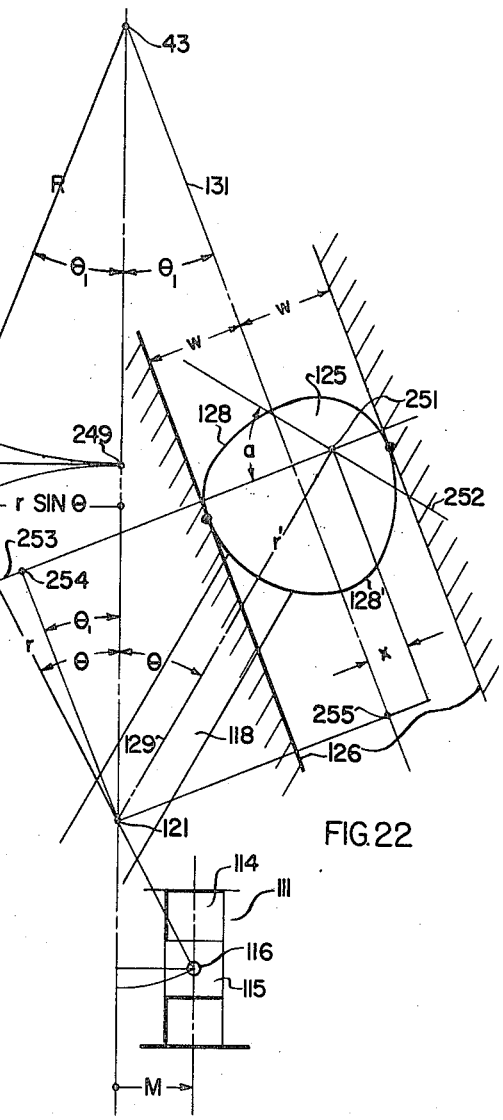

Figs. 5 and 6 are plan views of the cutter end of the machine with certain parts removed and others broken away and appearing in section in the respective planes 5—5 of Fig. 11 and 6—6 of Figs. 3 and 11;

Fig. 7 is a vertical sectional view through the work head, in the plane 7—7 of Fig. 2;

Fig. 8 is a sectional view through the work head in the plane 8—8 of Fig. 7;

Fig. 9 is a fragmentary sectional view similar to the left part of Fig. 8 showing a cam driven mechanism for the work spindle installed in the work head;

Fig. 10 is a vertical sectional view in a plane at right angles to Fig. 9, showing the cam driven mechanism;

Fig. 11 is a detail vertical sectional view taken in plane 11—11 of Fig. 6;

Fig. 12 is a side elevation of a pair of clutch members of one kind produced by the machine;

Fig. 13 is a section in plane 13—13 of Fig. 12;

Fig. 14 is an end view of another type of clutch produced by the machine;

Fig. 15 is a diagram illustrating the relative motions involved in cutting the clutch of Fig. 14;

Fig. 16 is an end view of yet another type of clutch produced by the machine;

Fig. 17 is a diagram illustrating the relative motion involved in cutting the clutch of Fig. 16;

Figs. 18, 19 and 20 are diagrams illustrating the relative motions involved in cutting still another type of clutch; and Figs. 21, 22 and 23 are diagrams to illustrate the geometrical form of a cam employed in the machine.

Figure 1:
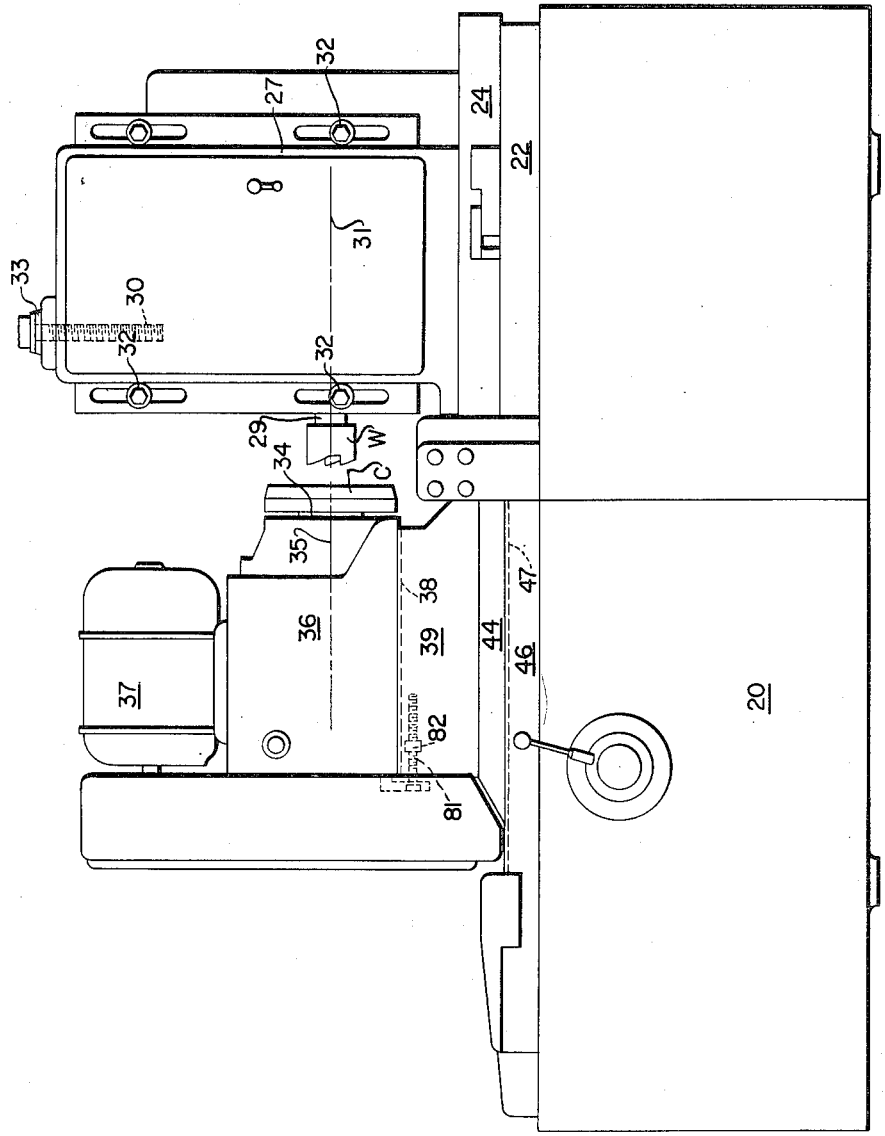
Figs. 1 and 2 are respectively a front elevation and a plan view of the complete machine.

As shown in Figs. 1 and 2, the machine comprises a frame 20 on which a cross-slide 22 is adjustable on transverse horizontal ways 21. This cross-slide has means including an arcuate way 23 for supporting a member 24 for angular adjustment about a vertical axis 25. Member 24 has ways 26 along which a column 27 is adjustable horizontally, longitudinally of the frame, i. e. at right angles to the direction of adjustment of cross-slide 22. Adjustable vertically on the column is a work head 28 in which there is journaled for rotation on axis 31 a work spindle 29 for carrying a work piece W. This axis 31 is parallel to ways 26 and intersects axis 25 at right angles. The vertical adjustment may be effected by first loosening screws 32 which clamp the head to the column and then turning a knob 33 to which is connected a vertical adjusting screw 30. By the several adjustments described, a work piece W on spindle 29 can be adjusted (1) transversely and vertically with respect to frame 20, (2) angularly about vertical axis 25, and (3) in the direction of its own axis of rotation 31.

The teeth of the work piece W are cut with a rotary tool C mounted on a cutter spindle 34. This tool C may be either a bladed cutter of the disc or face mill types or an abrasive wheel. The spindle 34 is journaled for rotation about axis 35 in a housing 36 on which the main drive motor 37 of the machine is mounted. The housing is adjustable along ways 38, Fig. 1 and 2, which extend in the direction of axis 35, upon a sector 39. This sector is supported by means, including arcuate way 41 and trunnion 42, Fig. 3, for angular adjustment about a vertical axis 43 upon a swinging base 44. The angle of adjustment is shown by an indicator 40 on sector 39 and a cooperating scale on sliding base 46. The swinging base 44 is movable angularly about the same vertical axis 43 along arcuate way 45, Fig. 5, on a sliding base 46. The sliding base is movable longitudinally of the frame 20 on horizontal ways 47. By these several adjustments the cutter can be adjusted axially to compensate for dimensional changes due to wear and re-sharpening, and for other purposes, and the cutter axis may be adjusted about vertical axis 43 relative to the swinging base 44.

*The mechanism for effecting the several motions of the cutter*

Figure 4:
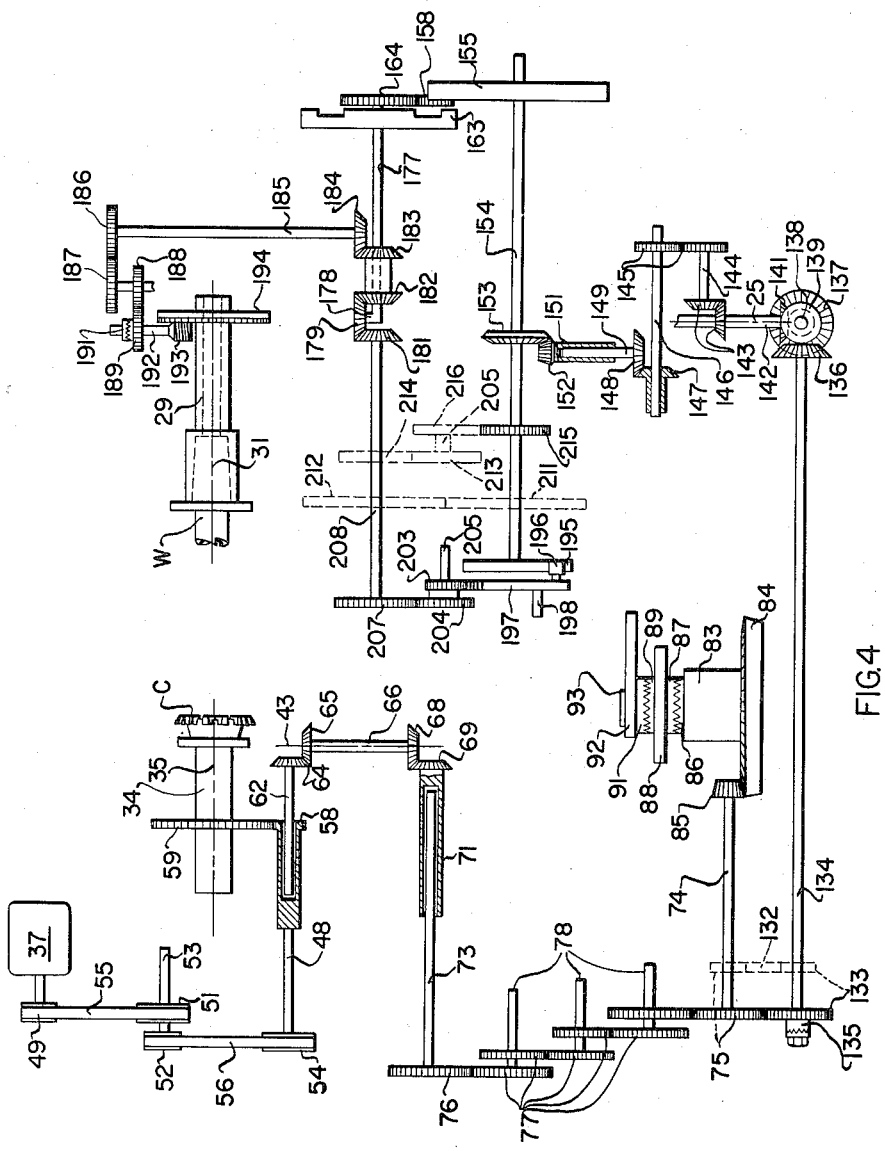
Fig. 4 is a drive diagram of the complete machine.

As shown in Figs. 3 and 4, the motor 37 is connected to a main drive shaft 48 by a flexible drive comprising a pulley 49 on the motor shaft; an idler pulley cluster comprising pulleys 51 and 52 on a shaft 53 that is journaled on anti-friction bearings in housing 36, a pulley 54 on shaft 48, and endless flexible belts 55 and 56. Preferably the pulleys and the belts are toothed to eliminate slippage; and adjustable idlers, not shown, are provided for tensioning the belts. Shaft 48 is journaled in the housing 36 and carries a pinion 58 which drives a gear 59 that is affixed to the cutter spindle 34. The latter is journaled in housing 36 on anti-friction bearings 61. A brake 57 for the motor 37 is arranged to stop the motor quickly when the motor is deenergized.

Telescoping within and splined to shaft 48 is a shaft 62 which is journaled by bearings 63 in sector 39. Shaft 62 carries a bevel pinion 64 meshing with a bevel gear 65 on a vertical shaft 66 that is journaled for rotation about axis 43 in bearings 67 mounted in trunnion 42. Affixed to the lower end of shaft 66 is a bevel pinion 68 meshing with a bevel gear 69 on a shaft 71 that is journaled for rotation in bearings 72 carried by sliding base 46. Shaft 71 extends in the direction of movement of the sliding base, and it telescopes and is splined to a shaft 73 that is journaled in frame 20. Also journaled in the frame 20 is a parallel shaft 74 to which a gear 75 is keyed, this gear being driven from gear 76 on shaft 73 through a plurality of ratio change gears 77 that are rotatable on shafts 78 that are adjustably supported by the frame. Access to the change gears 76 and 77 is provided by door 79, Fig. 2.

The telescoping of shafts 48 and 62 enables the adjustment of housing 36 on sector 39 in the direction of cutter axis 35. This adjustment is effected by means of a screw 81, Fig. 1, which is rotatable in the housing 36 and is threaded to a nut 82 affixed to sector 39. After such adjustment has been made the housing is clamped to the sector by screws, not shown. Since shaft 66 is coaxial with axis 43, angular adjustment of sector 39 upon the swinging base 44, and oscillation of the latter about this axis, are enabled; while the telescoping of shafts 71 and 73 enables reciprocation of the sliding base 46 on the frame. The mechanism for effecting these oscillating and reciprocating motions will now be described.

Journaled for rotation in the frame is a vertical shaft 83, Figs. 4, 5, 6 and 11, having a bevel gear 84 driven by a bevel pinion 85 on shaft 74. On the shaft is a face clutch member 86 whose teeth mesh with the similar teeth on hub 87 of a cam 88 whose function is to reciprocate the sliding base. The opposite hub 89 of the cam has like clutch teeth meshing with teeth on hub 91 of a cam 92 which oscillates the swinging base. The cams are secured on the shaft in the relationship shown by a screw-threaded nut 93, and upon loosening of the latter to permit disengagement of the clutch teeth the cams may be adjusted angularly with respect to each other and to the shaft 83. The periphery of cam 88 is engaged by a follower roller 94, Fig. 5, supported by a slide 95 which is adapted to roll along ways 96 of the frame on roller bearings 97. A piston 98, slidable in a cylinder 99 on the frame, acts on the slide to urge it constantly to the right in Fig. 5 to maintain the roller 94 on the cam 88. Hydraulic fluid is applied under pressure to the left end of the cylinder for this purpose. A roller 101 carried by the slide engages a sine block 102 which is adjustable about vertical axis 103 in a bracket 104 that is secured to the sliding base 46. A cylinder 105 secured to the frame contains a piston 106 whose rod 107 is secured to the sliding base, and hydraulic fluid pressure is applied to the end of the cylinder nearest the block 102 to constantly urge movement of the sliding base in a direction to hold the sine block 102 against roller 101. Accordingly as the cam 88 rotates, the slide 95 is reciprocated along ways 96 and the sliding base is reciprocated along ways 47. The amplitude of the sliding base motion depends upon the inclination of the sine block to the ways 96, and may be varied by adjusting the block about axis 103. After such adjustment the block is clamped to bracket 104 by tightening a clamp screw 108.

A follower roller 109, Fig. 6, for cam 92 is carried by a slide 111 which is superimposed upon and reciprocates in the same direction as slide 95, transversely of the machine. For this purpose the slide 111 has a key 112 disposed in a keyway 113, Figs. 3, 5 and 11, formed in slide 95 in parallel relation to ways 96. Slide 111 has a guideway 114 parallel to ways 47. Slidable in this guideway is a follower block 115 pivoted by a pin 116 to a block 117. The latter is carried by a lever 118 which is fulcrumed on a stub shaft 119 on the sliding base; the fulcrum axis being designated 121. Block 117 is adjustable on lever 118, in a direction radial of axis 121, by means of an adjusting screw 122, and after such adjustment is clamped by a wedge 123 actuated by a screw 124. On the opposite end of lever 118 is a cam 125 that is confined between parallel plane faces 126 of lugs 127 formed on the swinging base 44, these lugs constituting a follower yoke for the cam. Preferably the side faces 128 of the cam are symmetrical with respect to center line 129, Figs. 21 and 22, which extends radially from fulcrum 121 of the lever, and the parallel surfaces 126 are symmetrical with respect to line 131, which extends radially from axis 43 of the swinging base. The cam is so shaped that the swinging base is moved in constant velocity relation to rectilinear motion of the slide 111. This constancy is unaffected by changes in ratio effected by adjusting the pivot pin 115 toward or away from fulcrum axis 121 and is also unaffected by motion of the sliding base since such motion is parallel to guideway 114. The shape of cam surfaces 128 will be described more fully hereinafter in connection with Figs. 21, 22 and 23.

*The drive for the work spindle*

The work spindle 29 is driven by the motor 37 through the gear 75, Fig. 4. Depending upon the desired direction of work spindle rotation this gear meshes either directly or through an idler gear 132 with a gear 133 that is connected to a horizontal shaft 134 by a fine pitch face toothed coupling 135. By means of this coupling the work spindle can be brought into any desired phase relationship with the cams 88 and 92. Shaft 134 extends longitudinally of the machine and through bevel gears 136 and 137 drives a shaft 138 which extends transversely of the machine, i. e. in the direction of ways 21. Both shafts 134 and 138 are journaled for rotation in the frame 20. Splined to shaft 138 for motion axially therealong is a bevel pinion 139 meshing with a bevel gear 141 on a vertical shaft 142 journaled in the cross-slide 22, the shaft extending along axis 25. Shaft 142 through bevel gears 143, shaft 144 and spur gears 145 drives a shaft 146. Shafts 144 and 146 are both journaled in angularly adjustable member 24 and extend in the direction of ways 26, parallel to the work spindle 29. Splined to shaft 146 for axial motion therealong is a bevel gear 147 meshing with a gear 148 on vertical shaft 149. The latter and also gears 147 and 148 are supported for rotation in the column 27. Coaxial with shaft 149 and splined thereto for axial motion thereon is a shaft 151 which is journaled for rotation in work head 28 and has at its upper end a bevel pinion 152 meshing with a bevel gear 153 on shaft 154, Figs. 4 and 7 to 10, which, like the work spindle, is journaled for rotation in the work head.

Secured to shaft 154 is the drive disc 155 of a Geneva index mechanism, there being on the disc a drive roller 156 and drive pin 157, Fig. 8, one side of the latter having gear teeth 158 thereon. The roller and the semicylindrical surface of the pin are arranged to ride respectively on outer and inner surfaces, 159 and 161, of curved slots 162 in the driven disc 163 of the index mechanism. On the driven disc is a gear 164 for meshing with teeth 158. The arrangement, described in detail in Patent No. 2,477,105, is such that during approximately one quarter of each revolution of constantly rotating drive disc 155, the drive pin and roller coact with the curved slots to advance the driven disc by one-half revolution, accelerating the driven disc gradually from a standstill to maximum velocity and then decelerating it gradually to a stop. Between the acceleration and deceleration there is a drive at constant velocity resulting from gear teeth 158 meshing with gear 164.

During the part of each rotation of the drive disc when it is free of the driven disc the latter is locked by a lock dog 165, Fig. 7, this dog engaging in one of two diametrically opposed notches 166 in the disc. The lock dog is on one end of a lever 167 which is fulcrumed on the work head by a pin 168. The lever carries a roller 171 which rides on a cam 172 which acts to lift the dog from the notch 166 at the time the drive means 156, 157, become effective to turn the driven disc and to allow the dog to seat in the opposed notch at the time the drive means disengage the disc. The lock dog is urged toward and then held in its seated position by a spring 173 which acts between lever 167 and a second lever 174 fulcrumed on pin 168. Lever 174 carries a roller 175 that rides on a cam 176 which, like cam 172, is keyed to shaft 154. Cam 176 serves to rock lever 174 to relieve the force exerted by spring 173 on the lock dog at the time the latter is being lifted by cam 172.

The driven disc 163 is secured to a shaft 177 which is journaled in the work head and supports a planet carrier 178 on which a bevel gear 179 is freely rotatable. This gear is the planetary gear of a differential gear assembly whose side gears 181 and 182 are coaxial with shaft 177. Gear 182 is rotatable on the latter as a unit with a bevel gear 183 which meshes with gear 184 on shaft 185. The latter drives the work spindle through a train comprising change gears 186—189, fine pitch toothed clutch 191, shaft 192 having hypoid pinion 193 thereon, and the mating hypoid gear 194 on the work spindle.

By the index mechanism and gear train just described the work spindle 29 is intermittently advanced to advance the work by one or more pitches; and, provided gear 181 is held stationary, the work spindle will remain stationary during the dwell periods between successive index operations. However the present invention provides a cam operated mechanism for turning the gear 181 during each such dwell period and for then returning it to its original position either just before or during the following index operation. The cam, designated 195, Figs. 4, 9 and 10, is secured to shaft 154. Riding on the periphery of the cam is a follower roller 196 carried by a gear segment 197. This segment is pivoted to the work head by pin 198 and is urged in a direction to hold its roller against the cam, i. e. clockwise in Fig. 10, by a piston 199 that is slidable in a cylinder 201 mounted on the work head. The piston is constantly urged to the right by fluid under pressure conducted by line 202 from a suitable source, not shown. The gear teeth on the segment mesh with those of gear 203. The latter is unitary with a pinion 204 and is keyed upon a shaft 205 which is journaled for rotation in the work head on bearing unit 206. Pinion 204 drives a gear 207 secured to shaft 208 to which differential side gear 181 is secured. This shaft is journaled for rotation in the work head on bearing unit 209 in coaxial relation to shaft 177.

In operation of the above described cam drive arrangement for the work spindle, as the cam 195 turns clockwise in Fig. 10 through angle B, it swings the segment 197 counterclockwise and through the related gearing drives the work spindle in one direction; and as it turns through angle B' it effects return of the segment to its original position. Ordinarily the cam 195 will be so shaped and angularly positioned on shaft 154 that it turns through angle B while the lock dog 165 is holding the Geneva driven disc 163 stationary. In any case since the cam makes one turn for each tooth-to-tooth indexing operation of the Geneva mechanism 155, 163, it will be seen that the beginning of each tooth cutting cycle finds the cam in the same position. The cam may be so formed that while it turns through angle B the work spindle is turned at constant velocity, for example for cutting tooth surfaces which are helicoids of constant lead; or it may be formed to turn the work spindle at varying velocity, for cutting helicoidal surfaces of varying lead. Whatever the cam shape, the angle through which the work spindle is turned for one swing of segment 197 can be varied as desired by substituting change gears 204, 207 of various ratios.

The cam mechanism 195, 197, etc. is readily removed from the machine and replaced by gears or by clamp means when it is desired to operate the machine either with constant rotation of the work spindle or with only tooth-to-tooth indexing motion of the work spindle. For example upon removal of the cam mechanism, meshing gears 211 and 212, Figs. 4 and 8, may be secured respectively on shafts 154 and 208, so that these shafts will rotate in constant velocity ratio in opposite directions. Or to cause them to rotate in the same direction, a pair of gears 213 and 214 may be secured respectively onto shafts 205 and 208, and a gear 216 on shaft 205 to mesh with a gear 215 which is permanently secured to shaft 154. Shaft 205 is thus driven in this instance from shaft 154 through the gears 215 and 216. When the work spindle is to have only indexing motion, the shaft 208 and the gears 211, 212 or 213, 214, are not employed and the shaft is held stationary by means of a suitable clamp, not shown.

*Several methods of producing clutches on the machine*

The machine can be operated in various ways to produce face clutch teeth of a wide variety of shapes. Several of these will now be described briefly in connection with Figs. 12 to 20, inclusive. For cutting face clutches with symmetrical teeth, employing a face mill cutter, the machine may be set up for only intermittent tooth-to-tooth indexing of the work spindle and depth feed of the sliding base 46 effected by cam 88. In this case the shaft 208 is clamped against rotation and the swinging base 44 is held stationary by a circular disc which is substituted for the cam 92. During each cutting operation the work piece, clutch member 217 or 218, Figs. 12 and 13, is held stationary and the cutter is fed inwardly along its axis 35 to thereby cut the opposite sides of spaced teeth of the work. In this case the cutter axis 35 may be parallel to work axis 31. In cutting clutch member 217 the outside blades of a face mill cutter follow the circular cutting path 219 and cut simultaneously the opposite concave sides of two spaced teeth 217a and 217b. When cutting the mating member 218 the circle 219 represents the cutting path described by the inside blades of a face mill cutter. The opposite convex sides of two spaced teeth 218a and 218b are cut simultaneously.

In order to produce helicoidal chamfers on the tops of the teeth, the method of operation just described may be modified by installing a cam 195 which produces a rotation of the work spindle at the commencement of the cutter in-feed, then a dwell while the cutter is fed into full depth and is withdrawn, and finally a further rotation of the work spindle during the terminal part of the withdrawal. This results in chamfering of the top of one of the two simultaneously-produced tooth surfaces at the beginning of the cutter in-feed and chamfering the top of the other one of these tooth surfaces during the end portion of the cutter withdrawal. For example as shown in Figs. 14 and 15, if the work is rotated about its axis 31 during the initial and terminal parts of its respective in-feed and withdrawal motions, the relative path of the cutter will be as represented by dotted line 222. When at point 223 on this path the cutting circle described by the cutting edge portion 224 of cutter blade 225 will be at 226a, and the cutter axis at 35a. When at point 227 on this path the cutting circle will be at 226 with its center at 35, and when at point 228 it will be at 226b with its center at 35b. As path 222 is traversed from 223 to 227 to 228, in Fig. 15, first a chamfer 229, Fig. 14, will be formed on the top of tooth 231, then the sides 232 of tooth 231 and tooth 233 will be formed, and finally chamfer 234 will be formed at the top of tooth 233.

Another method of simultaneously producing two sides of chamfered symmetrical radial teeth with a face mill cutter is illustrated in Figs. 16 and 17. It involves intermittent rotation of the work spindle only for tooth-to-tooth indexing, and swinging of the cutter about axis 43 by cam 92 in time with its feed motion produced by cam 88. The swinging motion of the cutter about axis 43, effected by cam 92 operating the swinging base 44, is a motion in the plane of symmetry of the two tooth surfaces, this being the plane containing axes 31 and 35. By causing this motion to take place in varying ratio to the depth feed, effected by cam 88 moving the sliding base 46, the cutter may be caused to give the tooth surfaces the desired profile shape, including a top chamfer.

In Figs. 16 and 17 the numeral 239 represents a reference circle which is concentric with the cutter axis and is located at the center of the round 235a at the juncture of the side and tip cutting edges of cutter 235. The combination of rectilinear motion of sliding base 46 in the plane of symmetry (the plane containing axes 31 and 35, Fig. 16) and of angular motion of the swinging base (about axis 43), causes this reference circle to follow path 238, Fig. 17, from position 239 to position 239', the cutter itself moving from dotted line position 235 to full line position 235'. During this motion the axis 43 of the swinging base motion is shifted from 43 to 43', Fig. 16, and the cutter axis from 35 to 35c. As the motion proceeds the round 235a forms the chamfered top surfaces 236a and 237a on the opposite sides of the respective teeth 236 and 237, and, at position 235′, 239′, the side edges of the cutter produce the tooth side surfaces. This method is further described in E. Wildhaber patent application Serial No. 424,197, filed April 19, 1954.

As shown in Figs. 18, 19 and 20, saw tooth clutches, that is clutches whose teeth have one side thereof, 241, at least approximately in a plane containing the clutch axis of rotation 31 and the other side thereof, 242, lying along, or approximately along, a helical surface coaxial with such axis, are also readily produced on the machine with either a face mill cutter 243 or a disc cutter 244 by a method described in Patent No. 2,464,913. The cutting tool is shaped to provide a curved edge 245 which describes a spherical cutting surface as the tool rotates on axis 35, for producing the helical tooth surfaces 242, and a straight edge 246 which describes a conical cutting surface for producing the substantially plane tooth surfaces 241. According to this method the cutter is fed depthwise relative to the work by action of cam 88, and is also rotated about axis 43 by cam 92 in time with the rotation of the work about axis 31 that is effected by operation of cam 195. Thereby cutter 244, for example, reaches the successive positions shown in Figs. 19 and 20 wherein the respective surfaces 242 and 241 are being cut. At the conclusion of such action the cutter is withdrawn from the work by operation of cams 92 and 88; and the work is indexed, to bring another tooth space thereof into cutting position, by operation of the index mechanism 155, 156, 157, 163. If necessary in order to quickly clear the cutter from the work prior to indexing or for other purposes, the cam 195 may be arranged to reverse the rotation of the work at the conclusion of the cutting of surface 241.

In certain instances, when the rotation of the work is to be in only one direction and at constant velocity, the cam 195 may be replaced by gears 211, 212 or by gears 213, 214, as heretofore described.

*The geometrical form of the constant velocity swing cam*

The shape of surfaces 128 of cam 125 will now be discussed with reference to Figs. 21, 22 and 23. In the central position of lever 118 that is shown in Fig. 21 the center line 129 of the lever, which intersects the lever's fulcrum axis 121, is coincident with the center line 131 of yoke surfaces 126, this center line intersecting the axis 43 about which the swinging base 44 pivots. The cam surfaces contact the yoke surfaces at opposed points 247 and 248. Line 247—248 is the contact normal and it intersects line 129 at point 249. The distances 43—249 and 249—121 are respectively designated R and r. In Fig. 21 the instantaneous ratio between the angular motions of lever 118 and swinging base 44 about their respective axes will therefore be $$\frac{R}{r}$$

As shown in Fig. 22 a motion M of slide 111 from the central position shown in Fig. 21, will swing the point 249 through angle $\theta$ to 249′. The distance of 249′ from the line of centers 43—121, which distance is equal to $r \sin \theta$, will always be related to M in the ratio:

$$\frac{M}{r \sin \theta} = \frac{\text{distance } 121—116}{r}$$

Thus irrespective of the distance to which pivot pin 116 is adjusted from the fulcrum 121, it is only necessary, in order to cause the rectilinear motion of slide 111 to be in constant velocity ratio to angular motion of the swinging base about axis 43, to maintain the relationship (1) $\qquad r \sin \theta = R \cdot \theta_1$ where $\theta_1$ is the angle in radians through which the swinging base moves for a motion of lever 118 through angle $\theta$. The shape that must be given cam surfaces 128 to maintain this equality may be determined in various ways.

For example the locations of a large number of tangents to each surface 128 may be completely determined with respect to center line 129 of the lever and with respect to a selected cam center point 251 on the center line. These many tangents, only three of which are shown in Fig. 23 at 126′, 126″ and 126‴, will completely envelop and define the cam shapes 128. The tangent lines may be located by determining the lengths of their perpendiculars y to the point 251, these perpendiculars being at various angles $a$ from a line 252 perpendicular to center line 129 at point 251. The respective perpendiculars y for tangents 126′, 126″ and 126‴ are designated y′, y″ and y‴, while the corresponding angles $a$ are designated $a$, $a''$ and $a'''$.

By reference to Fig. 22 it will be seen that (2) $\qquad y = w \pm x$ where $w$ is the distance of surfaces 126 from center line 131 and $x$ is the distance from center point 251 to line 131.

In Fig. 22 a line 253 is drawn through point 251 perpendicular to center line 131. A line parallel to 131 through axis 121 intersects line 253 at point 254. A line parallel to 253 through axis 121 intersects line 131 at point 255. It will be seen that the value of $x$ is distance 251—254 minus distance 121—255. Distance 251—254 is equal to $r' \sin(\theta + \theta_1)$ while distance 121—255 is equal to $(R+r) \sin \theta_1$. Accordingly:

(3) $\qquad x = r' \sin(\theta + \theta_1) - (R+r) \sin \theta_1$

It will also be seen from inspection that (4) $\qquad \theta + \theta_1 = a$

From the foregoing Equations 1 to 4 inclusive the locations of any desired number of different tangents like 126′, 126″ and 126‴ may be readily computed, thereby completely determining the specific shape of the cam surfaces 128 which will cause the angular motion of swinging base 44 to be in constant velocity ratio to rectilinear motion of slide 111.

Having now described the preferred embodiment of our invention, what we claim is:

1. A tooth cutting machine or the like, comprising a frame, a sliding base movable rectilinearly on the frame, a swinging base movable angularly on the sliding base about a first axis perpendicular to the direction of sliding base movement, a lever fulcrumed to the sliding base on an axis parallel to the first axis and having a cam surface engageable with a cam follower surface on the swinging base, a slide reciprocable rectilinearly on the frame at an angle to the direction of sliding base motion and having a straight guide surface extending in the last-named direction, a follower on the lever engaging said guide surface of the slide, and means for reciprocating the slide.

2. A machine according to claim 1 in which the cam surface is so shaped that the rectilinear motion of the slide and the angular motion of the swinging base are in constant velocity ratio.

3. A machine according to claim 1 in which the follower on the lever is adjustable thereon to different distances from the fulcrum of the lever.

4. A machine according to claim 1 in which there is a means to reciprocate the sliding base in time with reciprocation of the slide.

5. A machine according to claim 4 in which the means to reciprocate the sliding base comprises a second slide movable on the frame in the same direction as the first-mentioned slide, means for transmitting motion from the second slide to the sliding base, which means is adjustable to vary the transmission ratio, and means for reciprocating the second slide.

6. A machine according to claim 5 in which the respective means for reciprocating the slides comprise a pair of cams rotatable on the frame in coaxial and unitary relationship to each other.

7. A tooth cutting machine or the like comprising a frame, a swinging base movable angularly relative to the frame and having a follower surface extending in a direction generally radial of the axis of angular motion, a slide reciprocable on the frame in a direction perpendicular to said axis, said slide having a straight guide surface perpendicular to said axis and to the direction of reciprocation of the slide, and a lever for transmitting motion from the slide to the swinging base, said lever being fulcrumed relative to the frame on an axis parallel to the first-mentioned axis, said lever having a follower engageable with said guide surface and adjustable on the lever to different distances from the fulcrum axis of the lever, and said lever having a cam surface engageable with said follower surface and being of a shape so related to the follower surface that rectilinear motion of the slide and angular motion of the swinging base are in constant velocity ratio.

8. A tooth cutting machine or the like comprising a frame, a pair of slides reciprocable in parallel relationship on the frame, means on the frame for reciprocating the slides, a sliding base reciprocable on the frame in a direction at an angle to the direction of reciprocation of the slides, means for transmitting motion from one slide to the sliding base comprising an angularly adjustable sine block on the sliding base and a follower for said block on one of said slides, a swinging base angularly movable on the sliding base, and means comprising a lever fulcrumed to the sliding base for transmitting motion from the other slide to the swinging base, said other slide having a guide surface thereon parallel to the direction of reciprocation of the sliding base.

9. A tooth cutting machine or the like comprising a frame, a sliding base reciprocal on the frame, a slide reciprocable on the frame in a direction inclined to the direction of reciprocation of the sliding base, said slide having a guide surface parallel to the direction of reciprocation of the sliding base, and a lever fulcrumed to the sliding base on an axis perpendicular to the directions of reciprocation of the slide and the sliding base, said lever carrying a follower engageable with said guide surface, means for adjusting the follower on the lever to different distances from the fulcrum of the lever, means for effecting reciprocation of the slide, and means for effecting reciprocation of the sliding base.

10. A tooth cutting machine comprising a rotatable cutter spindle and a rotatable work spindle, a reciprocable sliding base, a swinging base mounted on the sliding base for angular oscillation about an axis perpendicular to the direction of reciprocation of the sliding base, a housing journaling the cutter spindle and supported by said swinging base, a motor on said housing connected to the cutter spindle for driving the latter, actuating means connected to and operated by said motor for effecting reciprocation of the sliding base and oscillation of the swinging base, a cam connected to the motor for rotation thereby, a cam operated member oscillated by said cam upon rotation of the latter, a Geneva index having a drive member connected to the motor for operation thereby and having an intermittently rotated driven member, and a differential gear set having one element thereof connected to said cam operated member for oscillation thereby in time with operation of said actuating means, another element thereof connected to the Geneva index driven member for intermittent rotation thereby in time with operation of said actuating means, and the third element thereof connected to the work spindle for driving the latter.

11. A tooth cutting machine or the like comprising a rotatable cutter spindle and a rotatable work spindle, a reciprocable sliding base, a swinging base mounted on the sliding base for angular oscillation about an axis perpendicular to the direction of reciprocation of the sliding base, a housing journaling the cutter spindle and means for adjusting said housing on the swinging base in the direction of the cutter spindle axis, a motor on said housing connected to the cutter spindle for driving the latter, actuating means connected to and operated by said motor for effecting reciprocation of the sliding base and oscillation of the swinging base, a cam geared to said actuating means for rotation by the motor in time with actuation of the slides, a cam operated member oscillated by said cam upon rotation of the latter, a Geneva index having a drive member geared to said slide actuating means for rotation by the motor in time with actuation of the slides, said index having an intermittently rotated driven member, and a differential gear set having one element thereof connected to said cam operated member for oscillation thereby, another element thereof connected to the Geneva index driven member for intermittent rotation thereby, and the third element thereof connected to the work spindle for driving the latter.

12. A tooth cutting machine or the like having a cutter spindle and a work spindle, a moving base supporting the cutter spindle, a motor and a drive shaft rotated thereby, actuating means geared to said shaft and connected to the moving base for effecting a back and forth motion of the latter, a cam geared to the shaft for rotation thereby, a member operated by said cam, an index having a drive member geared to said shaft and having an intermittently rotated driven member, and a differential gear set having one element thereof connected to the cam operated member, another element thereof connected to the index driven member, and a third element connected to the work spindle for driving the latter.

13. A machine according to claim 12 in which the cam is rotated in time with operation of the index drive member whereby said one element of the differential gear set makes one complete oscillation for each indexing option.

14. A machine according to claim 13 in which the cam and the index drive member are secured together and rotate as a unit.

No references cited.